United States Patent [19]
Hirose et al.

[11] 3,918,257
[45] Nov. 11, 1975

[54] EXHAUST GAS PURIFYING DEVICE FOR AN INTERNAL COMBUSTION ENGINE

[75] Inventors: Yutaka Hirose; Shigetake Yoshimura, both of Hiroshima, Japan

[73] Assignee: Toyo Kogyo Co., Ltd., Hiroshima, Japan

[22] Filed: May 6, 1974

[21] Appl. No.: 467,545

Related U.S. Application Data
[63] Continuation of Ser. No. 214,116, Dec. 30, 1971, abandoned.

[30] Foreign Application Priority Data
Dec. 30, 1970  Japan.................... 45-129501

[52] U.S. Cl. ............... 60/284; 60/285; 123/41.12; 123/119 F; 123/179 G; 123/180 T; 123/196 M; 74/860
[51] Int. Cl.² ........................................ F02B 75/10
[58] Field of Search ............... 60/284, 285; 74/860; 123/119 F, 41.12, 196 M, 196 S, 179 G, 180 T; 181/38

[56] References Cited
UNITED STATES PATENTS

| | | |
|---|---|---|
| 2,194,007 | 3/1940 | Clementson.................. 123/196 M |
| 2,396,000 | 3/1946 | Findley ......................... 123/41.12 |
| 2,762,354 | 9/1956 | Winkler........................ 123/119 F |
| 2,937,490 | 5/1960 | Calvert ............................. 60/284 |
| 3,248,094 | 4/1966 | Ball ............................... 123/119 F |
| 3,347,040 | 10/1967 | Leistritz............................ 60/285 |
| 3,529,586 | 9/1970 | Fort............................. 123/119 F |

*Primary Examiner*—Douglas Hart
*Attorney, Agent, or Firm*—Sughrue, Rothwell, Mion, Zinn & Macpeak

[57] ABSTRACT

Since the temperature of an engine or reactor is low during warming operation in an internal combustion engine having a reactor, the combustion in the engine is improper, and the purification of exhaust gas in the reactor is not effective until the reactor reaches a predetermined reaction temperature. Accordingly, in the present invention, when the temperature of the engine or reactor is low, the engine speed is increased above maximum speed at normal warm up, low speed engine operation as determined by the position of the choke valve to abruptly warm the engine, and thereby to increase the reaction temperature of the reactor quickly so that the high speed operation improves the combustion in the engine in order to reduce the detrimental unburned components of the exhaust gas during the warming operation of the engine.

9 Claims, 5 Drawing Figures

EXHAUST GAS PURIFYING DEVICE FOR AN INTERNAL COMBUSTION ENGINE

This is a Continuation, of application Ser. No. 214,116, filed Dec. 30, 1971.

BACKGROUND OF THE INVENTION

This invention relates to an exhaust gas purifying device for an internal combustion engine for reducing pollutants such as hydrocarbon HC, carbon monoxide, CO, etc. in the exhaust gas during the warming operation after starting of the internal combustion engine.

Heretofore, in order to reduce pollution of the atmosphere by components such as hydrocarbon HC, carbon monoxide CO and nitrogen oxide NOx, etc. in the exhaust gas of an internal combustion engine, there have been used a thermal reactor for reburning unburned components such as hydrocarbon HC and carbon monoxide CO, etc. by supplying secondary air into the exhaust gas and a catalytic reactor for reducing nitrogen oxide NOx to make it nondetrimental. These reaches cannot purify the exhaust gas sufficiently until they reach a predetermined temperature of reaction. Therefore, when the internal combustion engine body and the purifying reaction are in the cool condition at the starting of the engine, the exhaust gas discharged from the exhaust port of the internal combustion engine is cooled by the purifying reactor having large heat capacity. Therefore, the exhaust gas is utilized so as to gradually warm these purifying reactors, but the reactors do not serve to purify the exhaust gas immediately after starting of the engine. As shown by curve A in FIG. 1, a substantial period of time is required before the temperature of the purifying reactor is sufficiently increased so as to effectively purify the exhaust gas, during which time a great deal of unburned components for pollution of the atmosphere such as hydrocarbon HC and carbon monoxide CO, etc. are discharged.

Further, a choke system has heretofore been adopted generally for stabilizing the rotation of the engine during the warning operation immediately after starting of the engine with a mixture ratio adequate to start the engine when the internal combustion engine and reactor are in a cool condition. As shown by curve A in FIG. 5 as will be hereinafter described, the maximum speed as determined by normal warm up operation of the choke system may not generally exceed 200 r.p.m., and yet the supply of air is limited. Accordingly, the intake mixture gas is a dense mixture ratio, and therefore the components for pollution of the atmosphere such as hydrocarbon HC and carbon monoxide CO, etc. are contained in substantial amounts in the exhaust gas.

SUMMARY OF THE INVENTION

An object of the present invention is to provide an exhaust gas purifying device for an internal combustion engine for reducing components for pollution of the atmosphere such as hydrocarbon HC and carbon monoxide CO, etc. in the exhaust gas at the time of the warming operation of the engine.

Another object of the present invention is to provide an exhaust gas purifying device for an internal combustion engine having reactors such as thermal reactor or exhaust gas reburning reactor and a catalytic reactor, etc., in which, when the engine is started when the temperature of the engine or the reactor is below a predetermined value, that is, the temperature required to warm the engine, the engine speed is maintained over the maximum engine speed defined by the normal warm up operating parameters the choke system of the engine from immediately after the time when the engine is started until the time when the engine temperature reaches a temperature indicating that the warming operation of the engine is complete and until the discharge of the components for pollution of the atmosphere is reduced to a predetermined amount and the temperature of the reactor reaches a predetermined adequate reaction temperature.

A further object of the present invention is to provide an exhaust gas purifying device for an internal combustion engine having a reactor which has means for controlling the intake mixture during a warming operation from immediately after starting of the engine to when the temperature of the engine or reactor is increased to a predetermined value when the engine is started with the temperature of the engine or reactor being below and predetermined value so as to hold the engine speed over the maximum normal speed called for by the choke system of the engine under such operation.

Still another object of the present invention is to provide an exhaust gas purifying device for an internal combustion engine having a reactor which has means for slightly opening both the throttle valve and choke valve of the carburetor during a warming operation of the engine from immediately after starting of the engine to when the temperature of the engine or reactor is increased to a predetermined value when the engine is started with the temperature of the engine or reactor being below said predetermined value so as to hold the engine speed over the maximum normal speed under control of the choke system of the engine in normal warm up operation.

Still another object of the present invention is to provide an exhaust gas purifying device which stops the operation of the normal means for controlling the intake mixture during a warming operation of the engine when the vehicle used with the engine as a power source is driven during the warming operation of the engine to hold the engine speed over the maximum speed called for by the choke system of the engine in such normal warm up operation.

Still another object of the present invention is to provide an exhaust gas purifying device which has means for preventing the very high noises of the exhaust gas and cooling fan when holding the engine speed high during warming operation of the engine, and a lubricating oil supply device for lessening the wear of the portions of the engine such as cylinders, pistons, etc., of the engine.

BRIEF DESCRIPTION OF THE DRAWINGS

These and other objects, features and advantages of the present invention, will become apparent from the following description taken in conjunction with the accompanying drawings, in which.

DESCRIPTION OF THE PREFERRED EMBODIMENT

The exhaust gas purifying device for an internal combustion engine will now be described with reference to the drawings.

Figure 1:
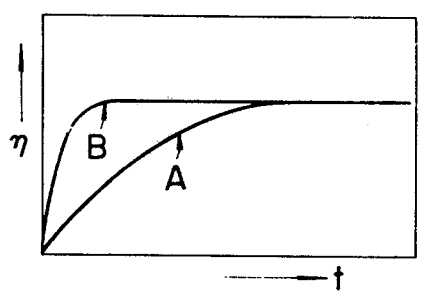
FIG. 1 is a graph of the exhaust gas purifying efficiency corresponding to the operating time $t$ after starting of an internal combustion engine with a reactor of the present invention and a conventional reactor.

The present invention contemplates the maintaining of the speed of an internal combustion engine, having either or both of an exhaust gas reburning reactor and a catalytic reactor, over the maximum speed of the engine as determined by normal control of the choke system under warm up, during the time from immediately after starting of the engine to the time when the temperature of the engine is increased so that the discharge of the components for pollution of the atmosphere is reduced to a predetermined amount or when the temperature of the reactor reaches a predetermined reaction temperature, when the engine is started in the state that the temperature of the internal combustion engine or reactor is below a predetermined temperature. Accordingly, the heat generated in the engine is increased to reduce the components for pollution of the atmosphere exhausted from the engine itself. The exhaust gas discharged from the exhaust port of the engine is increased at the same time the temperature of the exhaust gas is raised so as to abruptly warm the reactor immediately after the starting of the engine to enhance the purifying efficiency abruptly as shown by a curve B in FIG. 1, thereby reducing the components for pollution of the atmosphere exhausted during the warming operation of the engine after starting of the engine is achieved.

Figure 2:
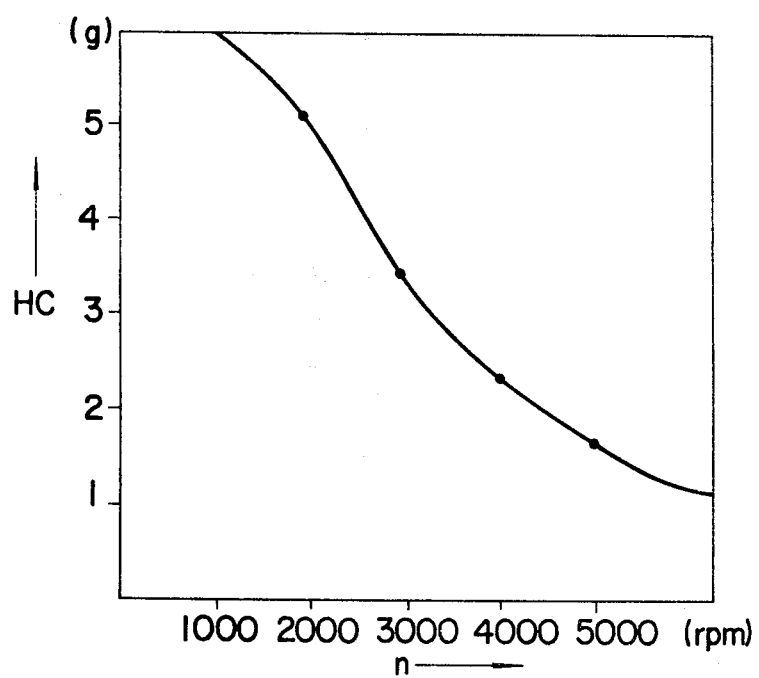
FIG. 2 is a graph of the relationship between the engine speed $n$ of the internal combustion engine during the warming operation of the engine and the amount of hydrocarbon HC in the exhaust gas generated in a constant time.

FIG. 2 shows the relationship between the amount of hydrocarbon HC exhausted during 2 minutes of warming time after starting of the engine and the respective speeds of the engine during the warming operation in a two rotor, rotary piston internal combustion engine (492cc × 2) having a reactor. As shown in FIG. 2, the amount of hydrocarbon HC discharged particularly at the time of the warming operation of the internal combustion engine having a reactor, was reduced, even though the amount of the exhaust gas was increased, as the speed $n$ of the engine was increased during warming operation of the engine.

Figure 3:
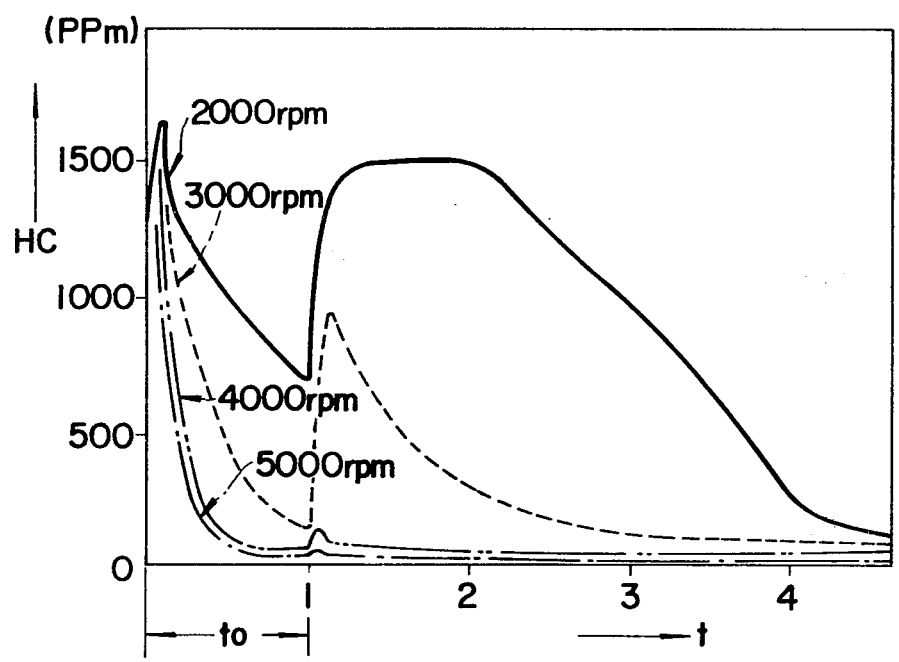
FIG. 3 is a graph showing the effect on the rate of the hydrocarbon HC in the exhaust gas with respect to the driving time $t$ in the case that the vehicle is traveling at a constant speed after the internal combustion engine is warmed at various engine speeds.

FIG. 3 shows the relationship between the amount of the hydrocarbon HC in the case where the vehicle has travelled at a speed of 40km/hour on a flat road after the two rotor rotary piston internal combustion engine (492cc × 2) having a reactor is warmed in operation for one minute at various speeds and the lapse of time.

As shown in FIG. 3, which is a graph of the exhausting rate of hydrocarbon HC in the case where the vehicle is operated at the same predetermined speed after the internal combustion engine having a reactor has started to warm during a predetermined time at various engine speeds, the higher the speed of the engine during warming operation of the engine the lower the exhausting amount of the hydrocarbon HC, and even when the vehicle, operated for a predetermined time $t_o$, is driven at the same loading conditions at a predetermined speed, the higher the speed of the engine during the warming operation $t_o$, the less the variation of the exhausting amount of hydrocarbon HC and accordingly the exhausting amount is reduced.

Thus, in the present invention, if the engine speed is held at a high speed over the normal maximum speed defined by the choke system of the engine in normal warming operation of the engine, after the starting of the internal combustion engine, the mixture gas introduced and compressed into the combustion chamber of the internal combustion engine is agitated by vortex flow in the engine so as to obtain a uniform mixture gas at the same time as the ignition plug is ignited, the flame propagation speed is fast, and further the temperature of the combustion chamber is held at a high temperature, whereby the burning state of the internal combustion engine itself at an optimum, and the amounts of hydrocarbon HC and carbon monoxide CO in the exhaust gas during warming operation of the eninge after starting thereof are reduced. If the internal combustion engine is rotated at high speed, the heat generated in the internal combustion engine is increased, the internal combustion engine itself is abruptly warmed at the same time the temperature of the exhaust gas discharged from the exhaust port is high, and the amount of the exhaust gas is large at the same time the reactors such as reburning reactor, catalytic reactor, etc., are abruptly brought to the reaction temperature, with the result that hydrocarbon HC, carbon monoxide CO and nitrogen oxide NOx discharged from the exhaust port of the internal combustion engine may be efficiently purified immediately after starting of the engine.

Figure 4:
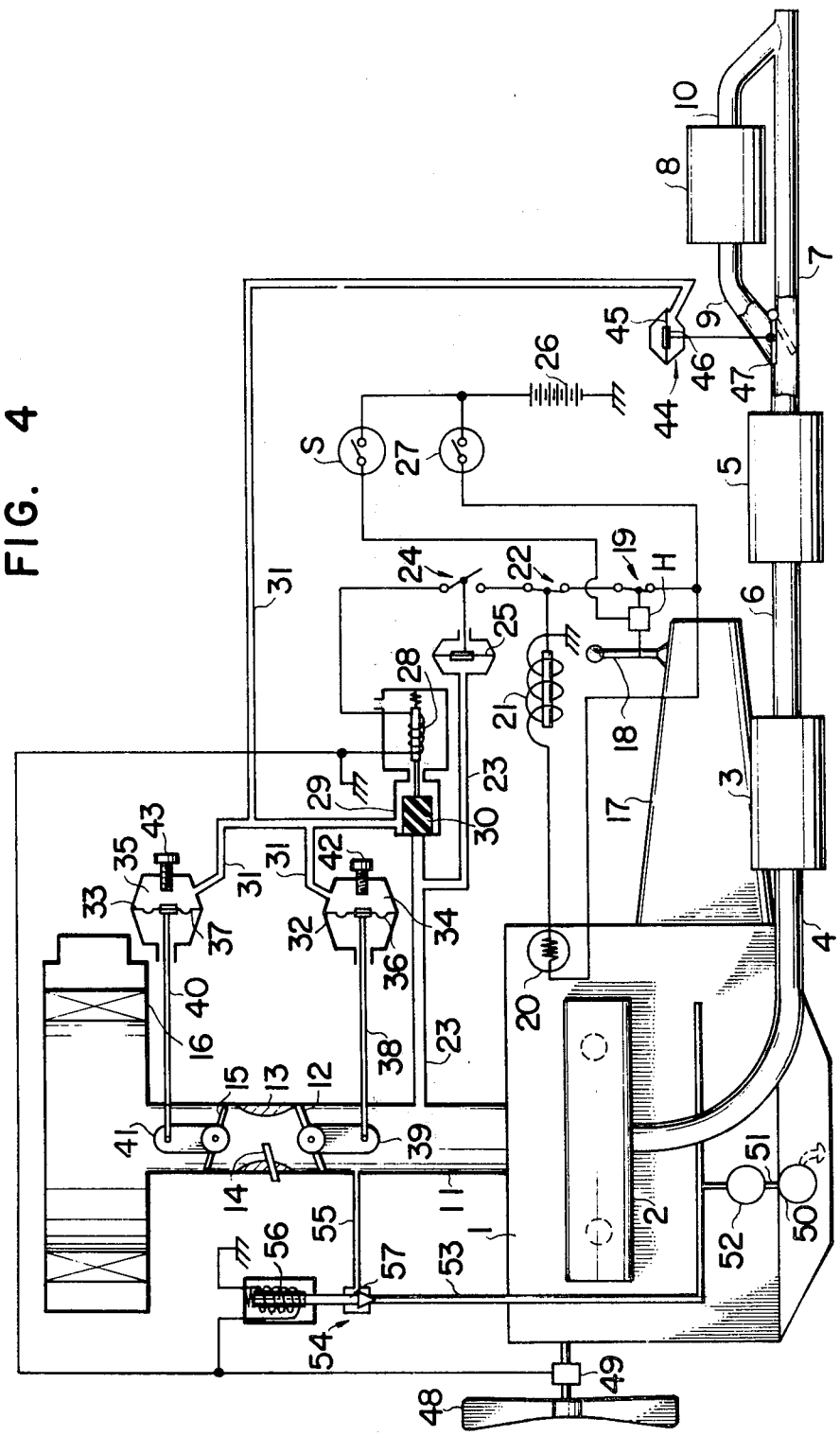
FIG. 4 is a diagram of one embodiment of the exhaust gas purifying device for an internal combustion engine of the present invention.

The present invention will now be described with reference to FIG. 4 which shows one embodiment of an exhaust gas purifying device of an internal combustion engine in accordance with the present invention.

Reference numeral 1 illustrates an engine or reactor having an exhaust gas flow inlet connected with the exhaust port of the engine 1 to be supplied with secondary air for reburning unburned gas (not shown). The numeral two indicates a catalytic reactor for purifying hydrocarbon HC and carbon monoxide CO. The numeral 3 is a catalytic reactor connected to the reactor 2, with an exhaust pipe 4 for mainly purifying nitrogen oxide NOx in the exhaust gas. 5 is a muffler connected with the catalytic reactor 3 through an exhaust pipe 6, and 7 is an exhaust pipe connected to the muffler 5. A warming muffler 8 is connected in a by-pass to the exhaust pipe 7 by exhaust pipes 9 and 10.

The numeral 11 is an intake pipe, 12 is a throttle valve, 13 is a venturi, 14 is a main nozzle, 15 is a choke valve, and 16 is an air cleaner. The numeral 17 is a transmission having a shift lever 18. The shift lever 18 is provided with a neutral switch 19 through a holding device H. The neutral switch 19 closes the contact only at the neutral position of the transmission 17 when the holding device H is not operated. This holding device H is so provided as to close the neutral switch 19 when the starter switch S is closed and to keep the neutral switch 19 open by operating the solenoid when the transmission is shifted to drive the vehicle and the engine is stopped until the starter switch S is again closed.

The numeral 20 is a thermosensor for detecting the temperatures of the cooling water or collant of the engine 1, lubricating oil, wall of the engine 1 and reactor 2 or catalytic reactor 3, etc. The thermosensor 20 does not energize the solenoid 21 during the warming operation, when the contact of the temperature detecting switch 22 is closed, but it energizes the solenoid 21 when the warming operation of the engine is completed and a predetermined temperature is reached so as to open the contacts of the temperature detecting switch 22.

23 is a vacuum pipe opened at one end thereof to the intake pipe 11. 24 is a switch for detecting the starting of the engine 1, and is opened at one end of the vacuum pipe 23 in the diaphragm chamber of one side of a diaphragm 25. Therefore, the engine 1 is started by a starter motor, but in the state not started, the switch 24 for detecting the starting of the engine does not absorb the diaphragm 25 and does not close the movable contact. When the mixture gas of the engine 1 is ignited so as to start the engine, the vacuum in the intake pipe is increased by the increase of the engine speed so as to shift the diaphragm 25 through the vacuum pipe 23, resulting in closing the movable contact of the switch 24 for detecting the starting of the engine. This switch 24 is so set as to close the movable contact regardless of the loading state after starting of the engine.

The numeral 26 is a battery, 27 is an ignition switch, and 28 is a solenoid of a solenoid valve 29 which is connected from the battery 26, through the ignition switch 27, neutral switch 19, temperature detecting switch 22 and switch 24 for detecting the starting of the engine in series thereto. The solenoid valve 29 opens the valve 30 to connect the vacuum pipe 23 with the pipe 31 when the solenoid 28 is energized. 32 and 33 are a throttle positioner and choke positioner having diaphragm chambers 34 and 35, respectively, connected with the pipe 31.

When vacuum in the intake pipe 11 is communicated to the pipe 31, the throttle positioner 32 and the choke positioner 33 absorb the diaphragms 36 and 37, respectively, so as to open the throttle valve 12 through the links 38 and 39, and the choke valve 15 through the links 40 and 41, respectively, to a predetermined opening controlled by the opening adjusting screws 42 and 43. 44 is a bypass valve which serves to effect the shifting of the diaphragm 45 against the spring 46 when the vacuum in the intake pipe 11 is present in the pipe 31 to urge the valve 47 so as to discharge the exhaust gas through the exhaust pipe 9, warming muffler 8 and exhaust pipe 10 into the atmosphere.

48 is a cooling fan, and 49 is a fan clutch which is disengaged so as to stop the rotation of the fan 48 when the solenoid 28 of the solenoid valve 29 is energized. 50 is an oil pump driven by the engine 1 for feeding under pressure the lubricating oil from the oil pan and is connected through the pipe 51, oil filter 52, pipe 53, solenoid valve 54 and pipe 55 to the intake pipe 11. The solenoid valve 54 is connected in parallel with the solenoid of the solenoid valve 29 so that when the solenoid 56 of the solenoid valve 54 is energized, it opens the valve 57 to connect the pipe 53 with the pipe 55 to pour lubricating oil fed under pressure by the oil pump 50 into the intake pipe 11.

The operation of the embodiment of this invention shown in FIG. 4 will now be described.

When the engine 1 is started in the state that the temperature of the engine is below that of the completion of the warming of the engine, under normal conditions the ignition switch 27 is closed and the starter switch S is closed so as to rotate the starter motor to rotate the engine 1. Whereupon, the choke valve 15 and the throttle valve 12 are closed, the dense mixture of gas is introduced into the engine 1 so as to enhance the starting characteristics of the engine 1. In the rotation of the engine 1 by the starter motor, the vacuum in the intake pipe 11 is small, the diaphragm 25 is not shifted, and the contact of the switch 24 for detecting the starting of the engine is opened.

When the mixture gas taken into the engine 1 is ignited so as to start the engine, since the engine speed is increased, the vacuum in the intake pipe 11 is increased, as, to shift the diaphragm 25 through the pipe 23 in order to close the movable contact of the switch 24 for detecting the starting of the engine. At this time, the shift lever 18 of the transmission 17 is disposed at neutral position so that the neutral switch 19 is closed and that the temperature of the engine is below the temperature of the completion of the warming of the engine, and accordingly the thermosensor 20 does not energize the solenoid 21 so as to close the contact of the temperature detecting switch 22. Therefore, if the switch 24 for detecting the starting of the engine is closed at the contact, the solenoid 28 of the solenoid valve 29 is energized so as to open the valve 30, with the result that the vacuum in the intake pipe 11 is introduced through the pipes 23 and 31 into the diaphragm chamber 34 of the throttle positioner 32 and the diaphragm chamber 35 of the choke positioner 33. By shifting the diaphragm 36, the throttle valve 12 is set through the links 38 and 39 by the opening and adjusting screw 42 to a predetermined opening. At the same time, by shifting the diaphragm 37, the choke valve 15 is set through the links 40 and 41 by the opening adjusting screw 43 to a predetermined opening. Therefore, by opening the throttle valve 12, the engine speed is increased over the maximum speed possible at the time the choke 15 is fully closed, such as, for example, to over 2,500 r.p.m. At the same time, by opening the choke valve 15, lowering of the engine speed is prevented because the warming of the engine 1 is developed to the point that choke 15, being open creates excessively dense mixture of gas.

When the solenoid valve 29 is opened so that the vacuum in the intake pipe 11 is communicated to the pipe 31, it shifts the diaphragm 36 of the throttle positioner 32 to the right, the diaphragm 37 of the choke positioner 33 to the right, lowers the the diaphragm 45 of the bypass valve 44. This urges the valve 47 open so as to discharge the exhaust gas from the engine 1 through the reactor 2, exhaust pipe 4, catalytic reactor 3, exhaust pipe 6, muffler 5, exhaust pipe 9, warming muffler 8 and exhaust pipe 10 into the atmosphere.

When the solenoid 28 of the solenoid valve 29 is energized, the fan clutch 49 is disengaged and the rotation of the fan 48 is stopped at the same time the solenoid 56 of the solenoid valve 54 is energized to open the valve 57 to introduce lubricating oil fed under pressure by the oil pump 50 through the pipe 51, oil filter 52, pipe 53, pipe 55 into the intake pipe 11 to mix lubricating oil into the mixture gas thereby preventing the wear of the pistons, cylinders, etc. of the engine 1.

Thus, when the engine 1 is maintained at a maximum speed possible at the time the choke is fully closed, or at 2,500 r.p.m., during warming of the engine after starting of the engine, the components for pollution of the atmosphere exhausted from the engine 1 are reduced and, at the same time, the reactor 2 and the catalytic reactor 3 are abruptly heated by the exhaust gas to reach the reaction temperature to enhance the purifying efficiency so as to reduce the components for pollution of the atmosphere exhausted at the time of warming of the engine.

When the engine is abruptly warmed by the high speed operation of the engine 1 to reach the normal operating temperature signifying the completion of the warming of the engine, the thermosensor 20 detects that temperature to energize the solenoid 21 to open the movable contact of the temperature detecting switch 22 and to deenergize the solenoid 28 of the solenoid valve 29. For this reason, the valve 30 of the solenoid valve 29 is closed so that the pipe 31 is connected to the atmosphere, and accordingly the vacuum acting on the diaphragm chambers 34 and 35 of the throttle positioner 32 and choke positioner 33, respectively, dissipated, with the result that the throttle valve 12 and the choke valve 15 are closed. (In this case, the choke valve 15 is again permitted to be opened by the manual operation, etc.) Therefore, the engine speed is reduced to the normal idling speed of the engine.

After the warming operation of the engine, the contact of the temperature detecting switch 22 is opened so that the solenoid valve 29 is closed with the result that the pipe 31 is connected to the atmosphere. In this case, the diaphragm 45 of the bypass valve 44 is not shifted, the valve 47 is biased by the spring 46, and the exhaust gas is discharged from the muffler 5 through the exhaust pipe 7 directly into the atmosphere. At the same time, the fan clutch 49 is engaged so as to rotate the fan 48 to cool the engine 1, and further the solenoid 56 of the solenoid valve 54 is deenergized to close the valve 57 so as to stop the supply of lubricating oil from the oil pump 50 into the intake pipe 11 to return to the state similar to the case of the normal internal combustion engine.

The neutral switch 19 prevents any danger when the engine 1 is rotated at high speed while the transmission 17 is engaged and there is no actuation of the engine brake, and further causes no inconvenience when the vehicle is driven immediately after starting of the engine, and opens the contact of the neutral switch 19 at any position except the neutral position so as not to operate the throttle positioner 32, bypass valve 44, fan clutch 49 and solenoid valve 54 of this invention by the action substantially the same as that of the completion of the operation of the warming of the engine.

In the aforementioned description, the substitution of the diaphragm device with the solenoid valve may be possible, and the thermosensor may be a thermistor, varistor, thermal expansion type, and instead of this thermosensor, a timer for setting the warming time until the discharge of the components for pollution of the atmosphere becomes less may also be used.

Further, it is possible to provide a switch interlocked with the starting motor for detecting the starting of the engine. In the above embodiment, the throttle valve and choke valve are opened for holding the engine speed at a high value during warming operation of the engine after starting of the engine, but it may also be possible to close the air bleed in the fuel passage of the carburetor to feed a large amount of fuel, and to increase the injection amount of fuel in an internal combustion engine of the fuel injection type so as to increase the engine speed.

Also, when the transmission is shifted to run the vehicle in the state where the temperature of the internal combustion engine or purifying reactor do not reach the temperature of the completion of the warming of the engine instead of the holding device, the neutral switch and the switch for detecting vehicle speed being connected in series, it may also be desirable not to operate the solenoid valves, etc., of the throttle positioner, bypass valve, fan clutch, lubricating oil supply device by the action substantially the same as that of the vehicle speed detecting switch at the time of warming of the engine.

Figure 5:
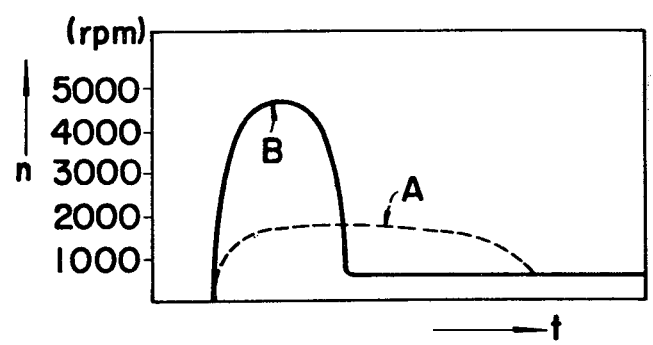
FIG. 5 is a graph showing the relationship between the driving time $t$ of the warming operation and the speed $n$ of the engine according to the warming operation of the engine of the present invention and the operation of the conventional choke system.

Heretofore, at the starting of the engine, in order to stabilize the mixture ratio possible to start the engine and the rotation of the engine in operation of the cooled engine, a choke system has generally been used, but as shown by a curve A in FIG. 5, the increase of the speed by the choke may not exceed a rotation of the engine of 2000 r.p.m. in general, but in the present invention the engine speed is readily held above 2,500 r.p.m. as shown by the curve B for purifying the exhaust gas during warming operation of the engine after starting of the engine, and which is entirely different from the conventional choke system.

As apparent from the foregoing description, the present invention serves to hold the internal combustion engine speed over 2,500 r.p.m. or over a maximum speed of the engine determined by the choke under normal starting conditions where the choke is fully closed immediately after the starting of the engine, by controlling the fuel and air supply system when the engine is started in the state when the temperature of the internal combustion engine or purifying reactor is below the temperature of the completion of the warming of the engine, thereby reducing the components for pollution of the atmosphere exhausted from the engine itself and increasing the amount of the exhaust gas discharged from the exhaust port of the internal combustion engine, while, at the same time, raising the temperature of the exhaust gas to abruptly warm the purifying reactor immediately after the starting of the engine to give a high purifying efficiency so as to reduce the components for pollution of the atmosphere exhausted from the engine during the warming operation of the engine immediately after the starting of the cooled engine.

It should be understood from the foregoing description that, since the vehicle is stopped during the warming operation of the engine at high speed, engine noise and exhaust noise are not cancelled by the other sound caused such as during travelling of the vehicle, so it is particularly noticeable. Accordingly, in this invention, the exhaust gas is discharged into the atmosphere through the muffler during the warming of the engine so as to decrease the great exhausting noise generated when the engine is warmed at high speed.

Further, this invention stops the rotation of the cooling fan of the internal combustion engine during warming of the engine rotated at high speed as aforementioned so as to prevent the cooling fan from generating a large amount of noise due to the high speed rotation of the engine and, at the same time, to shorten the warming operation of the engine.

In addition, the present invention may lessen the wear of the internal combustion engine produced during high speed warming operation of the engine by supplying lubricating oil into the cylinder or combustion chamber of the internal combustion engine during the high speed warming operation of the engine.

Further, the present invention may prevent the danger of the starting of the vehicle by stopping the high speed warming operation of the engine and the danger due to the lack of the engine brake when the vehicle is started without waiting until the completion of the warming operation of the engine, by enabling the high speed warming operation as aforementioned only when the transmission is at a neutral position and when the vehicle is not driven.

What is claimed is:

1. An exhaust gas purifying device for an internal combustion engine having; at least one combustion chamber, at least one ignition plug disposed in each combustion chamber, a carburetor including a choke valve and a throttle valve for controlling the flow of fuel and air mixture to each combustion chamber, a silencer for preventing exhaust gas noise during warming operation of the engine, and a reactor downstream of said at least one combustion chamber receiving the exhaust gas therefrom, said device comprising:
   a. means for maintaining ignition of said at least one ignition plug for each combustion chamber during warm up,
   b. a thermodetector for detecting the temperature of the engine or the reactor,
   c. control means for supplying to each combustion chamber a large volume fuel and air mixture during warm up to maintain the engine speed above 2,500 rpm, and
   d. means for operating said control means in response to temperature sensed by said thermodetector being below a predetermined value,
   and wherein said control means further includes means for controlling said silencer to exhaust the exhaust gas through the silencer into the atmosphere only during the warming operation of the engine when the temperature detected by the thermodetector is below said predetermined value.

2. An exhaust gas purifying device for an internal combustion engine having; at least one combustion chamber, at least one ignition plug disposed in each combustion chamber, a carburetor including a choke valve and a throttle valve for controlling the flow of fuel and air mixture to said at least one combustion chamber, and a reactor downstream of said at least one combustion chamber receiving the exhaust gas therefrom, and a cooling fan, said device comprising:
   a. means for maintaining ignition of said at least one ignition plug for each combustion chamber during warm up,
   b. a thermodetector for detecting the temperature of the engine or the reactor,
   c. control means for supplying to each combustion chamber a large volume fuel and air mixture during warm up to maintain the engine speed above 2,500 rpm,
   d. means for operating said control means in response to temperature sensed by said thermodetector below a predetermined value,
   and wherein said control means further comprises means for stopping rotation of the cooling fan during warming operation of the engine when the temperature detected by the thermodetector is below said predetermined value to eliminate the noise of the cooling air during warming operation.

3. An exhaust gas purifying device for an internal combustion engine having; at least one combustion chamber, at least one ignition plug disposed in each combustion chamber, a carburetor including a choke valve and a throttle valve for controlling the flow of fuel and air mixture to said at least one combustion chamber, and reactor downstream of said at least one combustion chamber receiving the exhaust gas therefrom, and oil supply means for supplying lubricating oil to the combustion chambers of the engine during the warming operation of the engine, said device comprising:
   a. means for maintaining ignition of said at least one ignition plug for each combustion chamber during warm up,
   b. a thermodetector for detecting the temperature of the engine or the reactor,
   c. control means for supplying to each combustion chamber a large volume fuel and air mixture during warm up to maintain the engine speed above 2,500 rpm,
   d. means for operating said control means in response to temperature sensed by said thermodetector below a predetermined value,
   and wherein, said control means includes means for controlling said oil supply means such that lubricating oil is supplied to the combustion chamber during warming operation of the engine when the temperature detected by the thermodetector is below said predetermined value, thereby reducing engine wear during warming operation.

4. An exhaust gas purifying device for an internal combustion engine having; at least one combustion chamber, at least one ignition plug disposed in each combustion chamber, a carburetor including a choke valve and a throttle valve for controlling the flow of fuel and air mixture to said at least one combustion chamber, and a reactor downstream of said at least one combustion chamber receiving the exhaust gas therefrom, said device comprising:
   a. means for maintaining ignition of said at least one ignition plug for each combustion chamber during warm up,
   b. a thermodetector for detecting the temperature of the engine or the reactor,
   c. control means for supplying to each combustion chamber a large volume fuel and air mixture during warm up to maintain the engine speed above 2,500 rpm, said control means including means for controlling the gas mixture introduced into the engine,
   d. means for operating said control means in response to temperature sensed by said thermodetector below a predetermined value, and
   e. means for terminating operation of said control means except when the transmission of the engine is in neutral position,
   whereby; the engine speed during warm up is held to 2,500 rpm to insure burning of said large volume fuel and air mixture within each combustion chamber during warm up of the engine and discharge of very high temperature exhaust gas to said reactor 5. An exhaust gas purifying device for an internal combustion engine having; at least one combustion chamber, at least one ignition plug disposed on each combustion chamber, a carburetor including a choke valve and a throttle valve for controlling the flow of fuel air mixture to said at least one combustion chamber, a silencer for preventing exhaust gas noise during warming operation of the engine, and a reactor downstream of said at least one combustion chamber receiving the exhaust gas therefrom, said device comprising:
  a. means for maintaining ignition of said at least one ignition plug for each combustion chamber during warm up,
  b. a thermodetector for detecting the temperature of the engine or the reactor,
  c. control means for supplying to each combustion chamber a large volume fuel and air mixture during warm up to maintain the engine speed above 2,500 rpm,
  d. means for operating said control means in response to temperature sensed by said thermodetector below a predetermined value, said control means comprising means for controlling the fuel air mixture introduced into the engine including means for controlling the choke valve and the throttle valve,
  and wherein, said control means further includes means for controlling said silencer for operation of the silencer when the temperature detected by the thermodetector is below said predetermined value.

6. An exhaust gas purifying device for an internal combustion engine having; at least one combustion chamber, at least one ignition plug disposed in each combustion chamber, a carburetor including a choke valve and a throttle valve for controlling the flow of fuel and air mixture to said at least one combustion chamber, a reactor downstream of said at least one combustion chamber receiving the exhaust gas therefrom, and a cooling fan, said device comprising:
  a. means for maintaining ignition of said at least one ignition plug for each combustion chamber,
  b. a thermodetector for detecting the temperature of the engine or the reactor,
  c. control means for supplying to each combustion chamber a large volume fuel and air mixture during warm up to maintain the engine speed above 2,500 rpm,
  d. said control means including means for controlling said choke valve and said throttle valve and means for operating said control means in response to temperature sensed by said thermodetector being below a predetermined volume,
  and wherein, said control means further comprises means for stopping rotation of the cooling fan during warming operation of the engine when the temperature detected by the thermodetector is below said predetermined value to eliminate the noise of cooling air movement during the warming operation of the engine.

7. An exhaust gas purifying device for an internal combustion engine having; at least one combustion chamber, at least one ignition plug disposed in each combustion chamber, a carburetor including a choke valve and a throttle valve for controlling the flow of fuel and air mixture to said at least one combustion chamber, a reactor downstream of said at least one combustion chamber receiving the exhaust gas therefrom, and oil supply means for supplying lubricating oil to said at least one combustion chamber of the engine during the warming operation of the engine, said device comprising:
  a. means for maintaining ignition of said at least one ignition plug for each combustion chamber during warm up,
  b. a thermodetector for detecting the temperatuure of the engine or the reactor,
  c. control means for supplying to each combustion chamber a large volume fuel and air mixture during warm up to maintain the engine speed above 2,500 rpm,
  d. said control means including means for controlling said choke valve and said throttle valve and means for controlling said oil supply means such that lubricating oil is supplied to the combustion chamber during warming operation of the engine, and means for operating said control means in response to temperature sensed by said thermodetector below a predetermined value,
  whereby; engine wear is reduced during warming operation and the engine speed during warm up is held to 2,500 rpm to insure burning said large volume fuel and air mixture within said each combustion chamber during warm up of the engine and the discharge of very high temperature exhaust gas to said reactor for accelerating warm up of said reactor with the large volume of the exhaust gas discharge from each combustion chamber to said reactor and with reduced unburned components in the exhaust gas discharge from said reactor to the atmosphere.

8. An exhaust gas purifying device for an internal combustion engine having; at least one combustion chamber, at least one ignition plug disposed in each combustion chamber, a carburetor including a choke valve and a throttle valve for controlling the flow of fuel and air mixture to said at least one combustion chamber, a reactor downstream of said at least one combustion chamber receiving the exhaust gas therefrom, and oil supply means for supplying lubricating oil to the combustion chambers of the engine during the warming operation of the engine, said device comprising:
  a. means for maintaining ignition of said at least one ignition plug for each combustion chamber during warm up,
  b. a thermodetector for detecting the temperature of the engine or the reactor,
  c. control means for supplying to each combustion chamber a large volume fuel and air mixture during warm up to maintain the engine speed above 2,500 rpm,
  d. said control means including means for controlling said choke valve and said throttle valve, and wherein, said control means includes means for controlling the oil supply means such that lubricating oil is supplied to the combustion chambers during warming operation of the engine when the temperature detected by the thermodetector is below a predetermined value, thereby reducing engine wear during warming operation, and whereby; the engine speed during warm up is held to 2,500 rpm to insure burning said large volume fuel and air mixture within said each combustion chamber during warm up of the engine and the discharge of very high temperature exhaust gas to said reactor for accelerating warm up of said reactor with the large volume of exhaust gas discharge from said each combustion chamber to said reactor and with reduced unburned components in the exhaust gas discharge from the reactor to the atmosphere.

9. An exhaust gas purifying device for an internal combustion engine having; at least one combustion chamber, at least one ignition plug disposed in each combustion chamber, a carburetor including a choke valve and a throttle valve for controlling the flow of fuel and air mixture to said at least one combustion chamber, a reactor downstream of said at least one combustion chamber receiving the exhaust gas therefrom, said device comprising:

a. means for maintaining ignition of said at least one ignition plug for each combustion chamber during warm up, b. a thermodetector for detecting the temperature of the engine or the reactor, c. control means for supplying to each combustion chamber a large volume fuel and air mixture during warm up to maintain the engine speed above 2,500 rpm, d. said control means including means for controlling said choke valve and said throttle valve, e. means for operating said control means in response to temperature sensed by said thermodetector being below a predetermined value, f. and said device further comprising means for terminating operation of said control means except when the transmission of the engine is in neutral position, whereby; the engine speed during warm up is held to 2,500 rpm to insure burning of said large volume fuel and air mixture within said each combustion chamber during warm up of the engine and the discharge of very high temperature exhaust gas to said reactor for accelerating warm up of said reactor with the large volume of exhaust gas discharge from said each combustion chamber to said reactor and with reduced unburned components in the exhaust gas discharge from the reactor to the atmosphere.

* * * * *